(12) United States Patent
Olson et al.

(10) Patent No.: US 11,558,211 B1
(45) Date of Patent: Jan. 17, 2023

(54) COLLABORATIVE POSTS

(71) Applicant: Meta Platforms, Inc., Menlo Park, CA (US)

(72) Inventors: Ryan Keenan Olson, Aspen, CO (US); Ian McIntyre Silber, San Francisco, CA (US); Peter Michael Cottle, Boulder, CO (US); Josselyn Tsai, Montauk, NY (US); Kevin Kaiwen Huang, Union City, CA (US); Christopher Wendel, Brooklyn, NY (US); Shilpa Sarkar, La Jolla, CA (US); James Kimmel, New York, NY (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/455,462

(22) Filed: Nov. 18, 2021

(51) Int. Cl.
| | |
|---|---|
| *G06F 15/16* | (2006.01) |
| *H04L 12/18* | (2006.01) |
| *H04L 67/306* | (2022.01) |
| *G06Q 50/00* | (2012.01) |

(52) U.S. Cl.
CPC ......... *H04L 12/1822* (2013.01); *G06Q 50/01* (2013.01); *H04L 12/1831* (2013.01); *H04L 67/306* (2013.01)

(58) Field of Classification Search
None
See application file for complete search history.

(56) References Cited

U.S. PATENT DOCUMENTS

| | | | | |
|---|---|---|---|---|
| 2010/0205179 | A1* | 8/2010 | Carson | G06F 16/148 707/E17.089 |
| 2016/0012739 | A1* | 1/2016 | Jafari | G09B 5/06 709/204 |
| 2018/0032619 | A1* | 2/2018 | Choi | H04L 63/102 |
| 2018/0107746 | A1* | 4/2018 | Jackson | G06F 16/955 |

\* cited by examiner

*Primary Examiner* — Wing F Chan
*Assistant Examiner* — Andrew Woo
(74) *Attorney, Agent, or Firm* — Lee & Hayes, P.C.

(57) ABSTRACT

Techniques are described for a social networking system to enable multiple users to collaboratively create, publish, receive attribution, and/or edit content. In some cases, the social networking system may be configured to distribute the collaborative content and feedback associated therewith based on metrics and relationships between collaborators of the collaborative content and users of the social networking system.

20 Claims, 10 Drawing Sheets

COLLABORATIVE POSTS

BACKGROUND

Social networking systems provide users with functionality to share content with other users. Most conventional social networking systems provide sharing in a one to many relationship via a user's account or page. However, having individual users share collaborative content via duplicate posts generates complexity for the users and increases resource consumption of the social networking system. Therefore, many users may be discouraged from creating, sharing, and consuming collaborative content in conventional social network applications.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
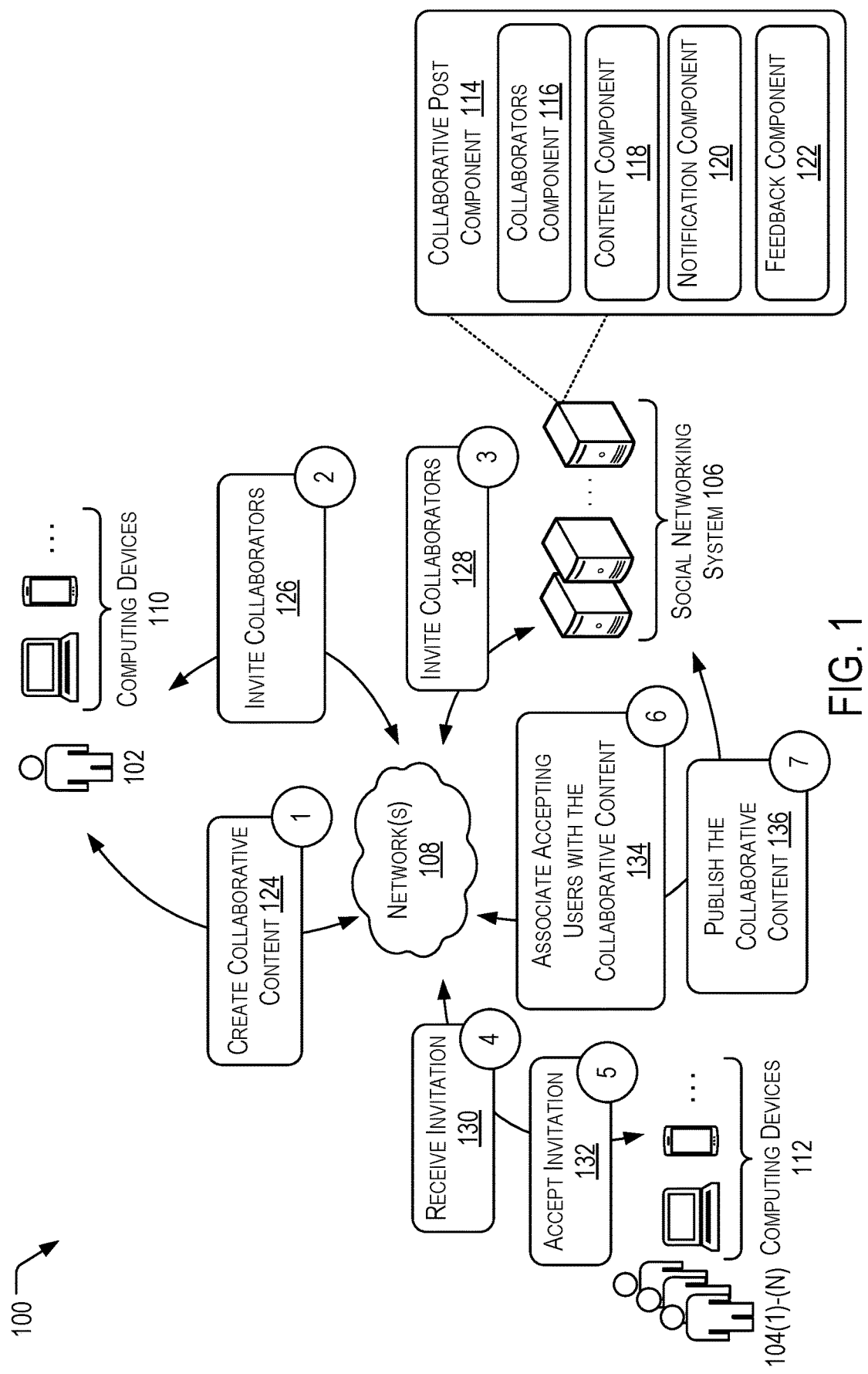
FIG. 1 is a view of an example system to assist with posting collaborative content to a social networking system, according to some implementations.

Social networking systems and websites are often used to share content associated with events, occasions, projects, and the like. The content is often attributable to multiple individuals and/or users of the social networking system. However, in conventional systems, often only a single user can post, upload, or otherwise add the content to the social networking system. In the conventional systems, the feedback, metrics, and the like associated with the content is often only attributed to the posting users and the content is only hosted by or in conjunction with a single user's account. However, the social networking system, discussed herein, allows for creation of collaborative posts or content that is attributable to multiple users or user accounts, provides metrics and feedback to the multiple user accounts, and/or hosted by or posted in conjunction with the multiple user accounts.

The social networking system, discussed herein, may allow a user to upload or otherwise post content to the social networking system. The user may also invite other users of the social networking system to participate as a collaborator on and be recognized as a contributor to the post or collaborative content. In this manner, the collaborative post may have multiple users or user accounts that are associated therewith. In some cases, the post may be published with respect to each of the collaborators' (e.g., the associated user) accounts and distributed to users that have expressed or indicated an interest in content published or created with each of the individual collaborators.

The social networking system may also be configured to distribute feedback for the collaborative post to one or more of the collaborators based on, for instance, a type of feedback (e.g., comment opposed to a like), the content of the post, a relationship between the user generating the feedback and the individual collaborators, and the like. For instance, a collaborative post may be distributed to each of the users "following" or otherwise associated with each of the individual collaborators. In other cases, the collaborative post may be distributed to a subset of the users "following" each of the individual collaborators.

As an illustrative example, a primary author or user may create, upload, post or the like collaborative content to the primary author's user account with the social networking system. During the creation process, the primary author may indicate individuals that have contributed to the collaborative content via a selectable option or icon. The social networking system may then invite each of the user accounts that the primary author selected or otherwise marked as contributing to the collaborative content.

The invited user may then either accept, reject, or ignore (e.g., an effective rejection) the invitation. If the invited user rejects the invitation, then the user is not added, associated with, or otherwise listed as a contributor or collaborator with respect to the collaborative content. In this manner, users are prevented from being associated with content the user does not endorse or otherwise support. However, if the user accepts the invitation, the social networking system may associate the user with the collaborative content. In some cases, the accepting user may be listed together with the primary author as a collaborator or author of the content. In some cases, an icon and/or user account name of the primary author and the accepting users may be displayed in conjunction with the collaborative content when another user is viewing or otherwise consuming the collaborative content.

The social networking system may also publish the collaborative content to the user accounts of both the primary user and the collaborating users that accepted the invitation. In this manner, the collaborative content is visible or otherwise available to users accessing or otherwise viewing each of the individual collaborators' user accounts.

The social networking system may also generate notifications and/or otherwise distribute the collaborative content to users of the social networking system that have indicated an interest in content associated with one or more of the collaborators. For example, if a collaborative content item is associated with a first, second, and third collaborator, the social networking system may distribute the collaborative content to individual users that "follow" or otherwise indicate an interest in content of any of the first user, the second user, or the third user. In some cases, the social networking system may filter the set of users receiving a distribution of the collaborative content form the social networking system, such that each receiving user only receives a single instance of a notification related to and/or the collaborative content. In this example, if a receiving user has indicated an interest in the content associated with both the first user and the second user, the social networking system may add the receiving user to the set of users only a single time, such that the receiving user does not receives a notification associated with the content from both the first user and the second user. In this manner, the social networking system may reduce congestion on the social networking system, computation resource consumption, and/or network resource consumption.

The social networking system may also manage feedback associated with the collaborative content. For example, the social networking system may allow each of the collaborators to access metrics, statics, comments, and the like associated with the collaborative post or content. In some cases, the social networking system may limit or otherwise select one or more of the collaborators to receive notification, alerts, and/or respond to the feedback. In this manner, the social networking system may limit the number of responses to feedback from the collaborators (e.g., both the first user and the second user responding to the same feedback), thereby again reducing congestion on the social networking system, computation resource consumption, and/or network resource consumption. In some cases, the primary author may be authorized to respond (and/or a collaborator designated by the primary author). In other cases, the social networking system may select one or more of the collaborators based at least in part on a relationship of the user providing feedback to each of the collaborators (e.g., the social networking system selects the user connected to or in a relationship with the user providing feedback), an amount of interaction between the collaborators and the collaborative content (e.g., the more active or engaged collaborator is selected), a number of interaction between followers of a collaborator and the content (e.g., an interest of the followers), and the like.

FIG. 1 is a view of an example system 100 to assist with posting collaborative content to a social networking system 106, according to some implementations. In some examples, the system 100 may include a primary user 102 that may be an original author or creator that uploads the collaborative content to the social networking system 106 as well as other collaborative users 104(1)-104(N) (collectively "users 104") invited by the primary user 102 as a collaborator or contributor on the collaborative content. The users 102 and 104 may interact with a social networking system 106 via a network 108 using computing devices, generally indicated by 110 and 112, respectively.

In the illustrated example, the social networking system 106 may include a collaborative post component 114. The collaborative post component 114 may include a number of sub-components or modules, such as collaborators component 116, content component 118, notification component 120, and/or feedback component 122. The collaborators component 116 may provide the user 102 with functionality to invite or add collaborators (e.g., the users 104) as authors of the collaborative content. The content component 118 may be configured to provide functionality to create, edit, and post the collaborative content to the accounts of the user 102 and/or the users 104. The notification component 120 may be configured to send the collaborative content, alerts and/or notifications to other users of the social networking system (not shown) in response to the users 102 or 104 posting and/or accepting invitation to collaborate on particular content items. In some cases, the notification component 120 may also be configured to determine a set or subset of users (not shown) to receive the collaborative content, alerts and/or notifications. The feedback component 122 may be configured to determine one or more of the users 102 and 104 to which to notify, alert, provide, and/or present feedback, comments, and the like related to the collaborative content.

With respect to FIG. 1, the user 102 may be inviting the users 104 to act as collaborators or contributors to particular collaborative content. For instance, in the illustrated example, the user 102 may, at operation 124 (indicated by "1"), create, upload, or add new collaborative content to, for example, an account associated with the user 102 hosted by the social networking system 106 via the content component 118. For instance, the user 102 may upload an image, video, textual content, or the like to the social networking system. As part of the uploading or creation process, and illustrated as operation 126 (indicated by "2"), the user 102 may select or otherwise indicate other users 104 to be invited to participate as a collaborator and receive attribution for the collaborative content. For example, the user 102 may select the users 104 by typing or entering the user's account name, selecting the user 104 from a list or via other tagging events, and the like. In this example, operation 126 is separated from operation 124 but it should be understood that in some cases, the invitation process may be incorporated into the collaborative content creation process.

In the illustrated example, at operation 128 (indicated by "3"), the social networking system 106 may receive the uploaded collaborative content and generate an invitation or notification for each of the users (e.g., the users 104) selected by the user 102. Next, at operation 130 (indicated by "4"), each of the individual users 104 may receive the notification, via the notification component 120 of the social networking system 106. For example, the users 104 may receive a notification or alert as to the creation and/or invitation with an option to accept. In some cases, the notification or alert may include a selectable link, icon, or message that may allow each of the users 104 to agree or consent to participate with the user 102 as a collaborator with respect to the collaborative content.

At operation 132 (indicated by "5"), the users 104 may accept the invitation to be added as a collaborator with respect ot the collaborative account. For example, one or more of the users 104 may select the link, icon, or message to opt-in as a collaborator or contributor with respect ot the collaborative content.

In this example, at operation 134 (indicated by "6"), the social networking system 106 may add the accepting users 104 as collaborators. For example, the social networking system 106 may cause an indication of the contribution or authorship of the user 102 and the accepting users 104 to the collaborative content. In this manner, when an additional user (not shown) views or otherwise consumes the collaborative content, the contribution and/or authorship of each of the user 102 and users 104 is indicated to the additional user via content displayed concurrently and/or in conjunction with the collaborative content, such as a listing of the collaborators' user account names, icons or images associated with the users 102 and 104 and the like.

At operation 136 (indicated by "7"), the social networking system 106 may publish the collaborative content. For example, the social networking system 106 may publish the collaborative content to a location associated with the accounts of each of the user 102 and the users 104. For instance, the collaborative content may be published to a home page, feed, or the like associated with each of the user 102 and the users 104. In this manner, an additional user (not shown) consuming and/or viewing content associated with any of the individual users 102 or 104 may be presented with the collaborative content. The social networking system 106 may, via the notification component 120, also distribute the collaborative content and/or notifications associated with the collaborative content to additional users that have previously indicated an interest in content associated with one or more of the users 102 and/or 104, as discussed in more detail with respect FIGS. 2 and 3 below.

In the illustrated example, each of the computing devices 110 and 112 may include one or more processors and memory storing computer executable instructions to implement the functionality discussed herein attributable to the various computing devices. In some examples, the computing devices 110 and 112 may include desktop computers, laptop computers, tablet computers, mobile devices (e.g., smart phones or other cellular or mobile phones, mobile gaming devices, portable media devices, etc.), or other suitable computing devices. The computing devices 110 and 112 may execute one or more client applications, such as a web browser (e.g., Microsoft Windows Internet Explorer, Mozilla Firefox, Apple Safari, Google Chrome, Opera, etc.) or a native or special-purpose client application (e.g., social media applications, messaging applications, email applications, games, etc.), to access and view content over the network 108.

The network 108 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which the computing devices 110 and 112 may access the social networking system 106 and/or communicate with one another.

The social networking system 106 may include one or more servers or other computing devices, any or all of which may include one or more processors and memory storing computer executable instructions to implement the functionality discussed herein attributable to the social networking system or digital platform. The social networking system 106 may enable its users 102 and 104 (such as persons or organizations) to interact with the social networking system 106 and with each other via the computing devices 110 and 112. The social networking system 106 may, with input from a user, create and store in the social networking system 106 a user account associated with the user. The user account may include demographic information, communication-channel information, and information on personal interests of the user. The social networking system 106 may also, with input from a user, create and store a record of relationships of the user with other users of the social networking system 106, as well as provide services (e.g., posts, comments, photo-sharing, messaging, tagging, mentioning of other users or entities, games, etc.) to facilitate social interaction between or among the users.

In some examples, the social networking system 106 may provide privacy features to the users 102 and 104 while interacting with the social networking system 106. In particular examples, one or more objects (e.g., content or other types of objects) of the system 106 may be associated with one or more privacy settings. The one or more objects may be stored on or otherwise associated with any suitable computing system or application, such as, for example, the social networking system 106, a client system, a third-party system, a social networking application, a messaging application, a photo-sharing application, or any other suitable computing system or application. Although the examples discussed herein are in the context of an online social network, these privacy settings may be applied to any other suitable computing system. Privacy settings (or "access settings") for an object or item of content may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example, and not by way of limitation, a user of the online social network may specify privacy settings for a user-profile page that identify a set of users that may access work-experience information on the user-profile page, thus excluding other users from accessing that information.

In particular examples, privacy settings for an object may specify a "blocked list" and/or a "restricted list" of users or other entities that should not be allowed to access certain information associated with the object. In particular examples, the blocked list may include third-party entities. The blocked list or restricted list may specify one or more users or entities for which an object is not visible. As an example, and not by way of limitation, a user may specify a set of users who may not access photo albums associated with the user, thus excluding those users from accessing the photo albums (while also possibly allowing certain users not within the specified set of users to access the photo albums). In particular examples, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example, and not by way of limitation, a particular concept node corresponding to a particular photo may have a privacy setting specifying that the photo may be accessed only by users tagged in the photo and friends of the users tagged in the photo. In particular examples, privacy settings may allow users to opt in to or opt out of having their content, information, or actions stored/logged by the social-networking system or shared with other systems (e.g., a third-party system). Although this disclosure describes using particular privacy settings in a particular manner, this disclosure contemplates using any suitable privacy settings in any suitable manner.

In particular examples, privacy settings may be based on one or more nodes or edges of a social graph. A privacy setting may be specified for one or more edges or edge-types of the social graph, or with respect to one or more nodes or node-types of the social graph. The privacy settings applied to a particular edge connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example, and not by way of limitation, a user, such as a user 102 and 104, may share an object to the social networking system 106. The object may be associated with a concept node connected to a user node of the user 102 and/or 104 by an edge. The user 102 and/or 104 may specify privacy settings that apply to a particular edge connecting to the concept node of the object or may specify privacy settings that apply to all edges connecting to the concept node. In some examples, the user 102 and/or 104 may share a set of objects of a particular object-type (e.g., a set of images). The user 102 and/or 104 may specify privacy settings with respect to all objects associated with the user 102 and/or 104 of that particular object-type as having a particular privacy setting (e.g., specifying that all images posted by the user 102 and/or 104 are visible only to friends of the user and/or users tagged in the images).

In particular examples, the social networking system 106 may present a "privacy wizard" (e.g., within a webpage, a module, one or more dialog boxes, or any other suitable interface) to the user 102 and/or 104 to assist the user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular examples, the social networking system 106 may offer a "dashboard" functionality to the user 102 and/or 104 that may display, to the user 102 and/or 104, current privacy settings of the user 102 and/or 104. The dashboard functionality may be displayed to the user 102 and/or 104 at any appropriate time (e.g., following an input from the user 102 and/or 104 summoning the dashboard functionality, following the occurrence of a particular event or trigger action). The dashboard functionality may allow the user 102 and/or 104 to modify one or more of the user's current privacy settings at any time, in any suitable manner (e.g., redirecting the user 102 and/or 104 to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular examples, one or more servers of the social networking system 106 may be authorization/privacy servers for enforcing privacy settings. In response to a request from the user 102 and/or 104 (or other entity) for a particular object stored in a data store, the social networking system 106 may send a request to the data store for the object. The request may identify the user 102 and/or 104 associated with the request and the object may be sent only to the user 102 and/or 104 (or a client system of the user) if the authorization server determines that the user 102 is authorized to access the object based on the privacy settings associated with the object. If the requesting user is not authorized to access the object, the authorization server may prevent the requested object from being retrieved from the data store or may prevent the requested object from being sent to the user.

In the search-query context, an object may be provided as a search result only if the querying user is authorized to access the object, e.g., if the privacy settings for the object allow it to be surfaced to, discovered by, or otherwise visible to the querying user. In particular examples, an object may represent content that is visible to a user through a newsfeed of the user. As an example, and not by way of limitation, one or more objects may be visible to a user's "Trending" page. In particular examples, an object may correspond to a particular user. The object may be content associated with the particular user or may be the particular user's account or information stored on the social networking system 106, or other computing systems. As an example, and not by way of limitation, the user 102 and/or 104 may view one or more other users 102 and/or 104 of an online social network through a "People You May Know" function of the online social network, or by viewing a list of friends of the user 102. As an example, and not by way of limitation, the user 102 and/or 104 may specify that they do not wish to see objects associated with a particular other user (e.g., the user 102 and/or 104) in their newsfeed or friends list. If the privacy settings for the object do not allow it to be surfaced to, discovered by, or visible to the user 102 and/or 104, the object may be excluded from the search results. Although this disclosure describes enforcing privacy settings in a particular manner, this disclosure contemplates enforcing privacy settings in any suitable manner.

In particular examples, different objects of the same type associated with a user may have different privacy settings. Different types of objects associated with a user may also have different types of privacy settings. As an example, and not by way of limitation, the user 102 and/or 104 may specify that the user's status updates are public, but any images shared by the user are visible only to the user's friends on the online social network. In some examples, the user 102 and/or 104 may specify different privacy settings for different types of entities, such as individual users, friends-of-friends, followers, user groups, or corporate entities. In some examples, the user 102 and/or 104 may specify a group of users that may view videos posted by the user 102 and/or 104, while keeping the videos from being visible to the user's employer. In particular examples, different privacy settings may be provided for different user groups or user demographics. As an example, and not by way of limitation, the user 102 and/or 104 may specify that other users who attend the same university as the user 102 and/or 104 may view the user's pictures, but that other users who are family members of the user 102 and/or 104 may not view those same pictures.

In particular examples, the social networking system 106 may provide one or more default privacy settings for each object of a particular object-type. A privacy setting for an object that is set to a default may be changed by a user associated with that object. As an example, and not by way of limitation, all images posted by the user 102 and/or 104 may have a default privacy setting of being visible only to friends of the first user and, for a particular image, the user 102 and/or 104 may change the privacy setting for the image to be visible to friends and friends-of-friends.

In particular examples, privacy settings may allow the user 102 and/or 104 to specify (e.g., by opting out, by not opting in) whether the social networking system 106 may receive, collect, log, or store particular objects or information associated with the user 102 and/or 104 for any purpose. In particular examples, privacy settings may allow the user 102 and/or 104 to specify whether particular applications or processes may access, store, or use particular objects or information associated with the user. The privacy settings may allow the user 102 and/or 104 to opt in or opt out of having objects or information accessed, stored, or used by specific applications or processes. The social networking system 106 may access such information in order to provide a particular function or service to the user 102 and/or 104, without the social networking system 106 having access to that information for any other purposes. Before accessing, storing, or using such objects or information, the social networking system 106 may prompt the user 102 and/or 104 to provide privacy settings specifying which applications or processes, if any, may access, store, or use the object or information prior to allowing any such action. As an example, and not by way of limitation, the user 102 and/or 104 may transmit a message to the user 102 and/or 104 via an application related to the online social network (e.g., a messaging app), and may specify privacy settings that such messages should not be stored by the social networking system 106.

In particular examples, the user 102 and/or 104 may specify whether particular types of objects or information associated with the user 102 and/or 104 may be accessed, stored, or used by the social networking system 106. As an example, and not by way of limitation, the user 102 and/or 104 may specify that images sent by the user 102 and/or 104 through the social networking system 106 may not be stored by the social networking system 106. In some examples, the user 102 and/or 104 may specify that messages sent from the user 102 and/or 104 to another user may not be stored by the social networking system 106. In some cases, the user 102 and/or 104 may specify that all objects sent via a particular application may be saved by the social networking system 106.

In particular examples, privacy settings may allow the user 102 and/or 104 to specify whether particular objects or information associated with the user 102 and/or 104 may be accessed from particular client systems or third-party systems. The privacy settings may allow the user 102 and/or 104 to opt in or opt out of having objects or information accessed from a particular device (e.g., the phone book on a user's smart phone), from a particular application (e.g., a messaging app), or from a particular system (e.g., an email server). The social networking system 106 may provide default privacy settings with respect to each device, system, or application, and/or the user 102 and/or 104 may be prompted to specify a particular privacy setting for each context. As an example, and not by way of limitation, the user 102 and/or 104 may utilize a location-services feature of the social networking system 106 to provide recommendations for restaurants or other places in proximity to the user 102 and/or 104. The default privacy settings of the user 102 and/or 104 may specify that the social networking system 106 may use location information provided from the computing device 110 and/or 112 of the user 102 and/or 104 to provide the location-based services, but that the social networking system 106 may not store the location information of the user 102 and/or 104 or provide it to any third-party systems. The user 102 and/or 104 may then update the privacy settings to allow location information to be used by a third-party image-sharing application in order to geo-tag photos.

In particular examples, privacy settings may allow a user to engage in the ephemeral sharing of objects on the online social network. Ephemeral sharing refers to the sharing of objects (e.g., posts, photos) or information for a finite period of time. Access or denial of access to the objects or information may be specified by time or date. As an example, and not by way of limitation, a user may specify that a particular image uploaded by the user is visible to the user's friends for the next week, after which time the image may no longer be accessible to other users. In some examples, a company may post content related to a product release ahead of the official launch and specify that the content may not be visible to other users until after the product launch.

In particular examples, for particular objects or information having privacy settings specifying that they are ephemeral, the social networking system 106 may be restricted in its access, storage, or use of the objects or information. The social networking system 106 may temporarily access, store, or use these particular objects or information in order to facilitate particular actions of a user associated with the objects or information, and may subsequently delete the objects or information, as specified by the respective privacy settings. As an example, and not by way of limitation, the user 102 may transmit a message to the user 104, and the social networking system 106 may temporarily store the message in a data store until the user 104 has viewed or downloaded the message, at which point the social networking system 106 may delete the message from the data store. In some examples, continuing with the prior example, the message may be stored for a specified period of time (e.g., 2 weeks), after which point the social networking system 106 may delete the message from the data store.

In particular examples, changes to privacy settings may take effect retroactively, affecting the visibility of objects and content shared prior to the change. As an example, and not by way of limitation, the user 102 may share a first image and specify that the first image is to be public to all other users. At a later time, the user 102 and/or 104 may specify that any images shared by the user should be made visible only to a first user group. The social networking system 106 may determine that this privacy setting also applies to the first image and make the first image visible only to the first user group. In particular examples, the change in privacy settings may take effect only going forward. Continuing the example above, if the user 102 and/or 104 changes privacy settings and then shares a second image, the second image may be visible only to the first user group, but the first image may remain visible to all users. In particular examples, in response to a user action to change a privacy setting, the social networking system 106 may further prompt the user to indicate whether the user wants to apply the changes to the privacy setting retroactively. In particular examples, a user change to privacy settings may be a one-off change specific to one object. In particular examples, a user's change to privacy may be a global change for all objects associated with the user.

In particular examples, the social networking system 106 may determine that user 102 and/or 104 may want to change one or more privacy settings in response to a trigger action associated with the user 102 and/or 104. The trigger action may be any suitable action on the online social network. As an example, and not by way of limitation, a trigger action may be a change in the relationship between a first and second user of the online social network (e.g., "un-friending" a user, changing the relationship status between the users, etc.). In particular examples, upon determining that a trigger action has occurred, the social networking system 106 may prompt the user 102 and/or 104 to change the privacy settings regarding the visibility of objects associated with the user 102 and/or 104. The prompt may redirect the user 102 and/or 104 to a workflow process for editing privacy settings with respect to one or more entities associated with the trigger action. The privacy settings associated with the user 102 and/or 104 may be changed only in response to an explicit input from the user 102 and/or 104 and may not be changed without the approval of the user 102 and/or 104. As an example, and not by way of limitation, the workflow process may include providing the user 102 with the current privacy settings with respect to the user 104 or to a group of users (e.g., un-tagging the user 102 or the user 104 from particular objects, changing the visibility of particular objects with respect to the user 104 or a group of users), and receiving an indication from the user 102 to change the privacy settings based on any of the methods described herein, or to keep the existing privacy settings.

In particular examples, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example, and not by way of limitation, a user's default privacy settings may indicate that a person's relationship status is visible to all users (i.e., "public"). However, if the user changes his or her relationship status, the social networking system 106 may determine that such action may be sensitive and may prompt the user to confirm that his or her relationship status should remain public before proceeding. In some examples, a user's privacy settings may specify that the user's posts are visible only to friends of the user. However, if the user changes the privacy setting for his or her posts to being public, the social networking system 106 may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular examples, a user may need to provide verification of a privacy setting on a periodic basis. A prompt or reminder may be periodically sent to the user based either on time elapsed or a number of user actions. As an example, and not by way of limitation, the social networking system 106 may send a reminder to the user to confirm his or her privacy settings every six months or after every ten photo posts. In particular examples, privacy settings may also allow users to control access to the objects or information on a per-request basis. As an example, and not by way of limitation, the social networking system 106 may notify the user whenever a third-party system attempts to access information associated with the user and require the user to provide verification that access should be allowed before proceeding.

Figure 2:
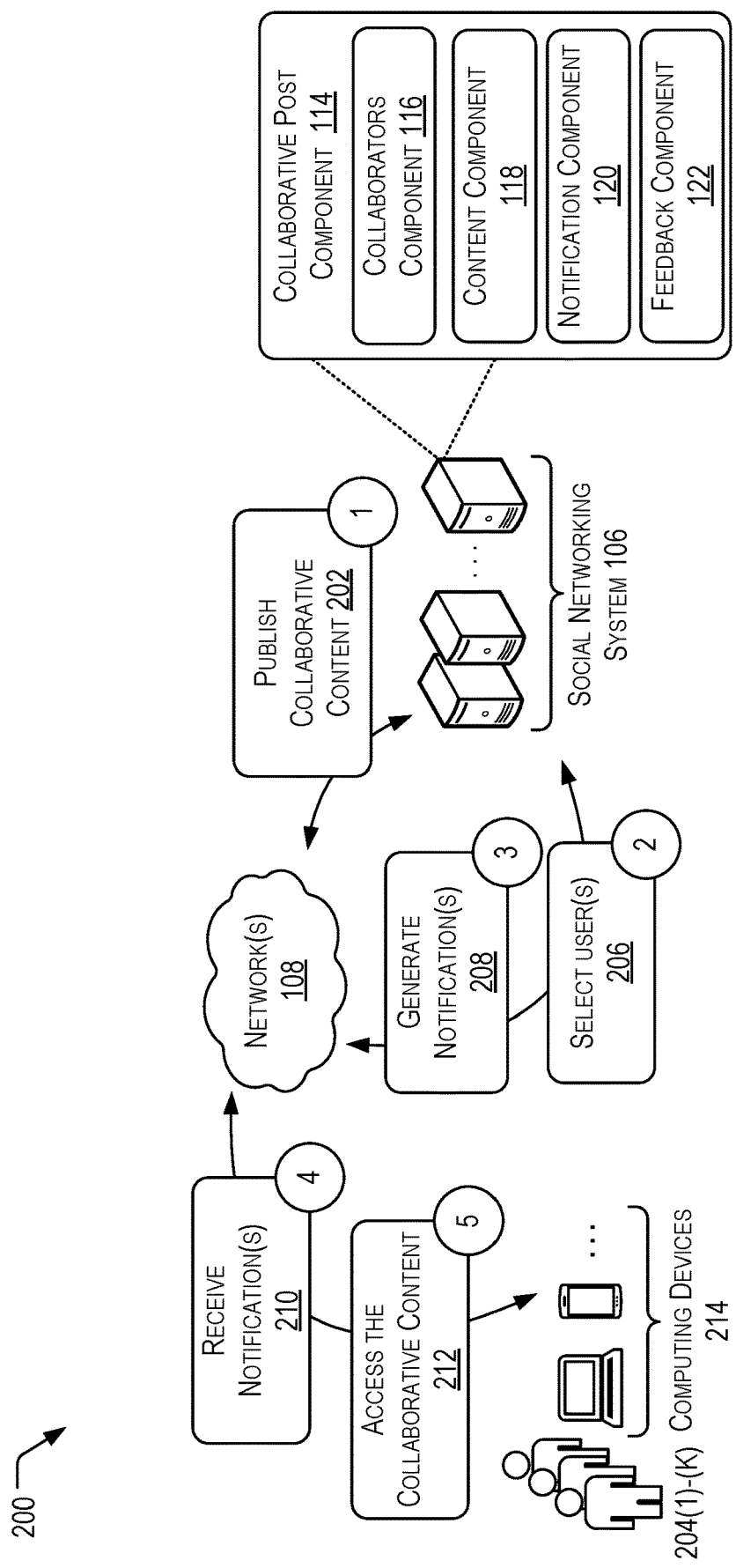
FIG. 2 is a view of another example system to assist with posting collaborative content to a social networking system, according to some implementations.

FIG. 2 is a view of another example system 200 to assist with posting collaborative content to a social networking system 106, according to some implementations. As discussed above, collaborative content may be associated with one or more of the users 102 and 104 of FIG. 1 and the social networking system 106 may, at operation 202 (indicated by "1"), publish the collaborative content. As discussed above, the social networking system 106 may publish the collaborative content to a location associated with the accounts of each of the user 102 (e.g., the primary or original author) and the users 104 (e.g., the users accepting the invitation to collaborate). For instance, the collaborative content may be published to a home page, feed, or the like associated with each of the collaborating users. The social networking system 106 may, in addition to publishing to one or more locations associated with the accounts of the collaborators also distribute or otherwise push the collaborative content or an notification related thereto to additional users, generally indicated by 204(1)-(K) (collectively "users 204"). The users 204 may interact with a social networking system 106 via a network 108 using computing devices, generally indicated by 214.

In the illustrated example, the social networking system 106 may, at operation 206 (indicated by "2"), select the users 204 from the users of the social networking system to receive the notification related to and/or distributions of the collaborative content and, at operation 208 (indicated by "3"), the social networking system may generate or otherwise send the notification to the selected users 204. In some cases, the users 204 may be selected as a subset of the users that have "followed" or otherwise indicated an interest in content associated with one or more of the collaborators (not shown) of the collaborative content. In other cases, the users 204 may be selected based at least in part on content, topics, subjects, or areas of interest of the users 204, historical consumption of the users 204, other data known about the users 204, and the like.

In some examples, the social networking system 106 may also filter the users 204 to remove any duplicate accounts in order to prevent any one user from receiving multiple notifications associated with the same collaborative content. For instance, if a first user has indicated an interest in content of two or more of the collaborators, the social networking system 106 may remove or filter any duplicate instances of the first user's account from the set of users 204 prior to generating or sending the notification.

In the illustrated example, at operation 210 (indicated by "4"), one or more of the users 204 may receive the notification and, at operation 212 (indicated by "5"), the users 204 may access or otherwise consume the collaborative content. For example, the notification may be a message or insight including a summary or portion of the collaborative content and/or a selectable link to a posting of the collaborative content (such as a feed), and the like. In some cases, the content of the notification may be selected by one or more of the collaborators, such as a selected featured image or portion of a video.

Figure 3:
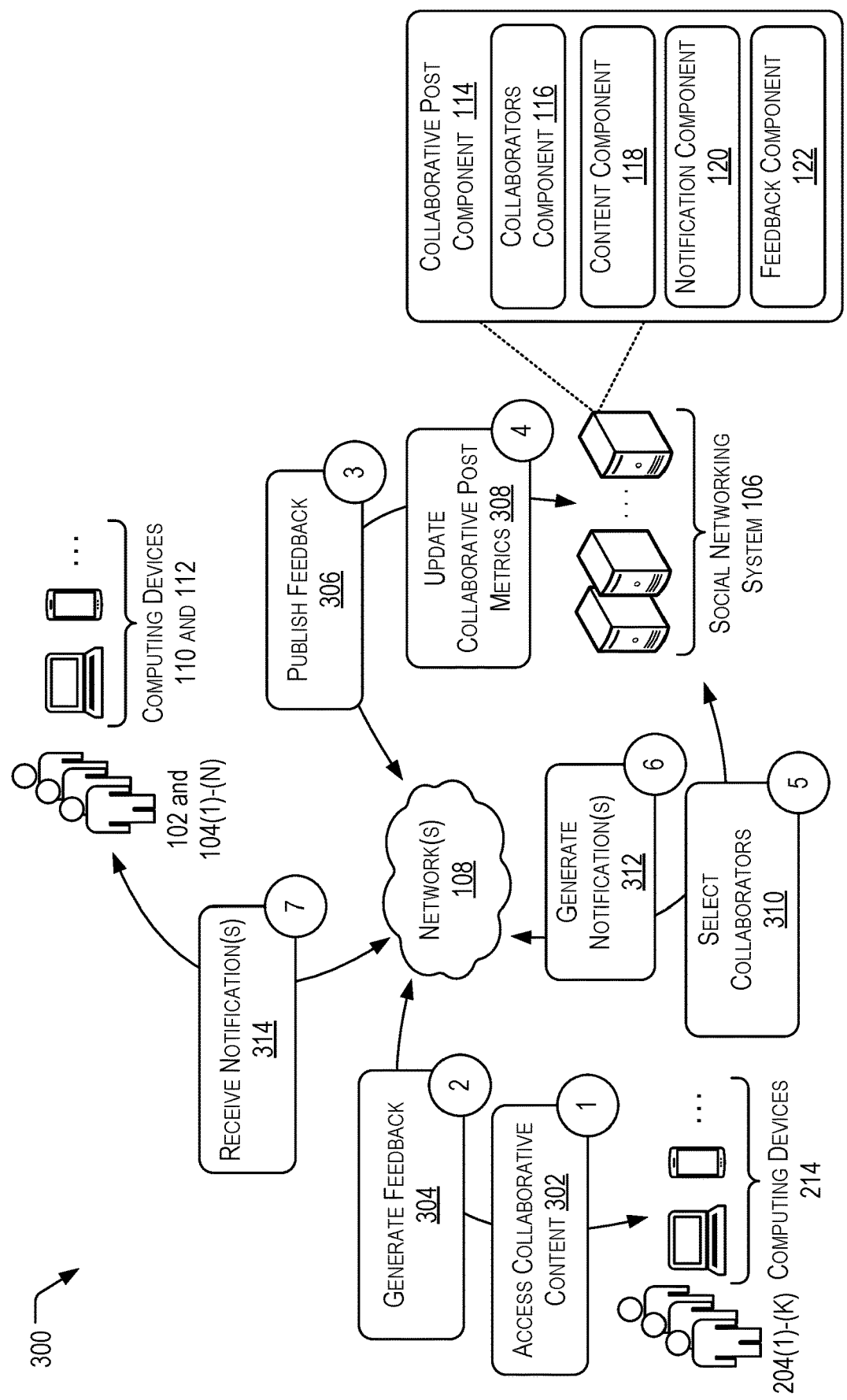
FIG. 3 is a view of yet another example system to assist with posting collaborative content to a social networking system, according to some implementations.

FIG. 3 is a view of yet another example system 300 to assist with posting collaborative content to a social networking system 106, according to some implementations. In this example, the users 204 may have accessed or otherwise consumed the collaborative content created with respect to the discussion of FIG. 1 and are providing comments or other feedback to the users 102 and 104 via the social networking system 106.

With respect to FIG. 3, at operation 302 (indicated by "1"), one or more of the users 204 may access the collaborative content associated with the users 102 and 104. For example, the social networking system 106 may stream or otherwise provide the content (such as video content) to the computing devices 214 associated with the users 204.

In this example, one or more of the users 204, at operation 304 (indicated by "2"), may generate feedback for the collaborators (e.g., users 102 and 104). The feedback may take various forms, for instance, the feedback may include comments, likes, dislikes, shares, or other feedback related to the collaborative content. In some cases, the feedback may be directed to one or more of the individual collaborators. For instance, the user 204 providing the feedback may select, mention, or otherwise indicate one or more of the users 102 and/or 104 when creating or generating the feedback via the social networking system 106.

In response to receiving the feedback, the social networking system 106, at operation 306 (indicated by "3"), may publish the feedback to each location associated with the collaborative content (e.g., the accounts of each of the users 102 and 104). For example, the feedback may be published as a comment or other addition to the collaborative content that is visible to a user, such as the users 204, consuming the collaborative content.

The social networking system 106 may also, at operation 308 (indicated by "4"), update collaborative post metrics associated with the collaborative content based at least in part on the feedback. For example, the social networking system 106 may modify one or more metric associated with the collaborative content, such as increasing a number of likes, increasing a number of dislikes, increasing a number of comments, and the like.

At operation 310 (indicated by "5"), the social networking system may select one or more of the collaborators (e.g., the users 102 and/or 104) to receive a notification related to the feedback and, at operation 312 (indicated by "6"), the social networking system 106 may generate and send the one or more notifications. For example, users 102 and/or 104 receiving the notifications may be selected based on content of the feedback, the type of feedback, a relationship between the user 204 generating the feedback and the user 102 and/or 104 receiving the feedback, and the like. In some cases, the users 102 and/or 104 may be scored and ranked with respect to the feedback, such that a top ranked user 102 and/or 104 may receive the notification related to the feedback. For instance, in some cases, with content (such as posts), the social network has the ability to rank the content based on the user's affinity towards the primary author, the secondary author, or some combined score (average, minimum, maximum) of all the authors. As an illustrated example, if a user 204(1) provides a comment expressing dislike for the collaborative content, the social networking system 106 may select the user 102 to respond based on a relationship between the user 102 and the user 204(1). In this manner, the reply by the user 102 may be more meaningful to the user 204(1) based on the pre-existing relationship and the system 106 may discourage or prevent the user 204(1) from receiving multiple replies potentially with different messages, thereby consuming additional network and system resources as well as potentially confusing the user 204(1).

The users 102 and/or 104 selected by the social networking system 106 may, at operation 314 (indicated by "7"), receive the notifications. In this manner, at least one of the users 102 and/or 104 may monitor feedback related to the collaborative content. Additionally, by limiting the users 102 and/or 104 receiving the feedback, the social networking system 106 may reduce the number of responses by the users 102 and/or 104 with regards to the feedback. For example, in some cases, if each of the users 102 and/or 104 receiving the feedback and each of the users 102 and/or 104 may respond resulting in duplicative responses potentially frustrating the user 204 generating the feedback and unnecessarily consuming network and system resources, as often a single response from the set of users 102 and/or 104 is sufficient. In some examples, the users 102 and/or 104 not selected by the social networking system 106 may receive a notification as to the selected user 102 and/or 104 notifying them that they do not need to respond. In other examples, the social networking system 106 may, at least temporarily, restrict the unselected users 102 and/or 104 from replying or otherwise responding to the feedback (e.g., for a predetermined period of time initiated from the time the feedback was uploaded to the system 106).

Figure 4:
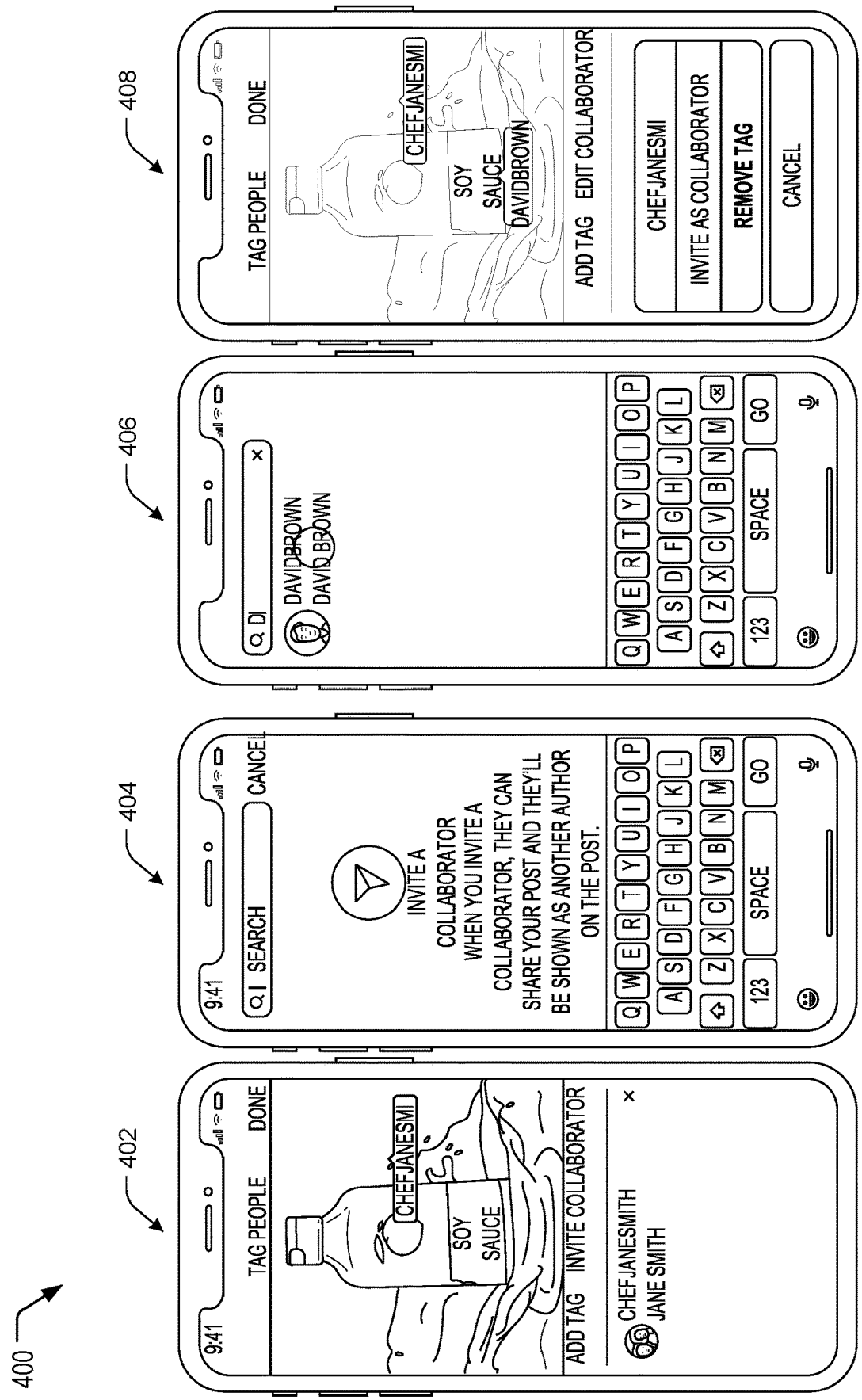
FIG. 4 is a view of example interfaces associated with adding a collaborator to a collaborative content item according to some implementations.

FIG. 4 is a view of example interfaces 400 associated with adding a collaborator to a collaborative content item according to some implementations. In the current example, a primary author has uploaded or otherwise created a new content with respect to the social networking system, as discussed herein. The primary author is, thus, presented with a tagging interface 402. In the tagging interface the primary author may be able to both tag individuals that are depicted in the content, via a tag icon, as well as to invite collaborators that have assisted in creating the content, via the invite collaborators icon, as illustrated.

Once the primary author selects the invite collaborators icon, the interface 402 transitions to the interface 404 and 406. Using the interfaces 404 and 406, the primary author may select other users of the social networking system to invite as collaborators. For instance, in this example, the primary author may type a user account name to invite the user as a collaborator. In other examples, the primary author may be presented with a list of users based on a number of factors such as relationship status via the social networking system, interactions between the users of the social networking system and the primary author (such as users commonly invited by the primary author as collaborators, users that have collaborated in the past with the primary author, users that have invited the primary author as collaborators with respect to their content, etc.), and the like.

In this example, once the primary author types the user account name, the list, as shown in interface 406, may populate and the primary author may select one or more of the users from the list. The primary author may then confirm the selected user and cause the invitation to be sent, via interface 408.

Figure 5:
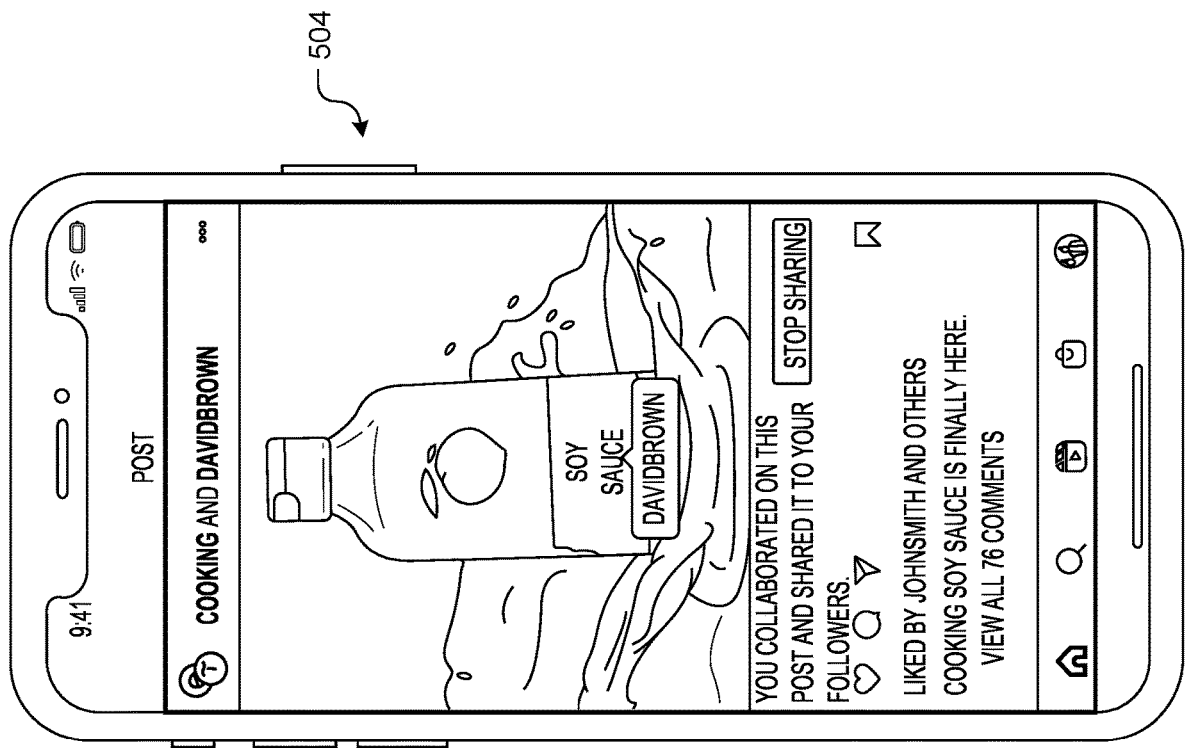
FIG. 5 is a view of example interfaces associated with accepting an invitation to collaborate on a collaborative content item according to some implementations.
Figure 5:
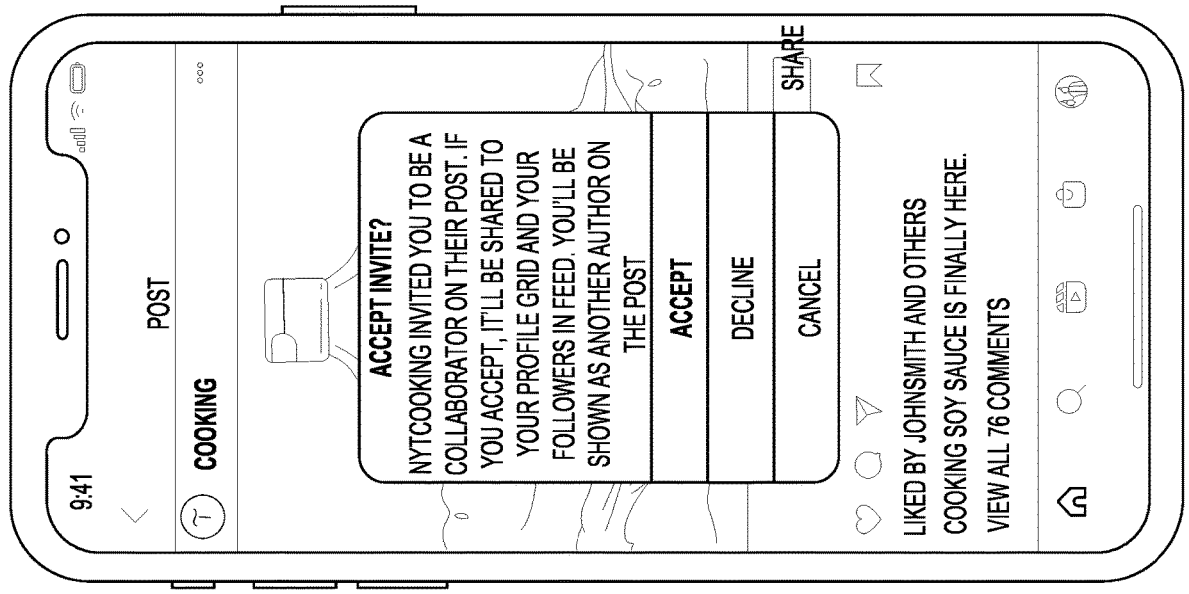

FIG. 5 is a view of example interfaces 500 associated with accepting an invitation to collaborate on a collaborative content item according to some implementations. Once the primary author sends an invitation to collaborate on a content item, as discussed above with respect to FIG. 4, the invited user may receive a notification associated with the invitation, as illustrated. In the current example, the invitation may be displayed as an overlay to the invited user and include options to accept, decline, or cancel (e.g., ignore), as illustrated with respect to interface 502. If the invited user accepts the invitation, the interface 502 transition to interface 504. As shown with respect to interface 504, the invited user may be associated with the collaborative content, listed as a collaborator or contributor with respect to the content, and the collaborative content may be published to a location associated with the invited user account and shared to other users having indicated an interest in content created or uploaded by the invited user.

However, if the user declines the invitation the user is not associated with the collaborative content. In this manner, the social networking system implements an opt in process and the invited user may prevent their user account information from being associated with content the invited user did not upload to the social networking system. Likewise, the invited user may ignore the invitation. In some cases, the invited user may receive reminders associated with the invitation until accepted or declined. In other cases, the social network system may allow the invited user to accept for a predetermined period of time (either determined by the system or by the primary author). Once the period of time expires, the social networking system may decline the invitation on behalf of the invited user, thereby requiring the primary author or, in some instance, another collaborator to re-invite the invited user, if the invited user desires to be recognized by the social networking system as a collaborator or contributor to the collaborative content.

Figure 6:
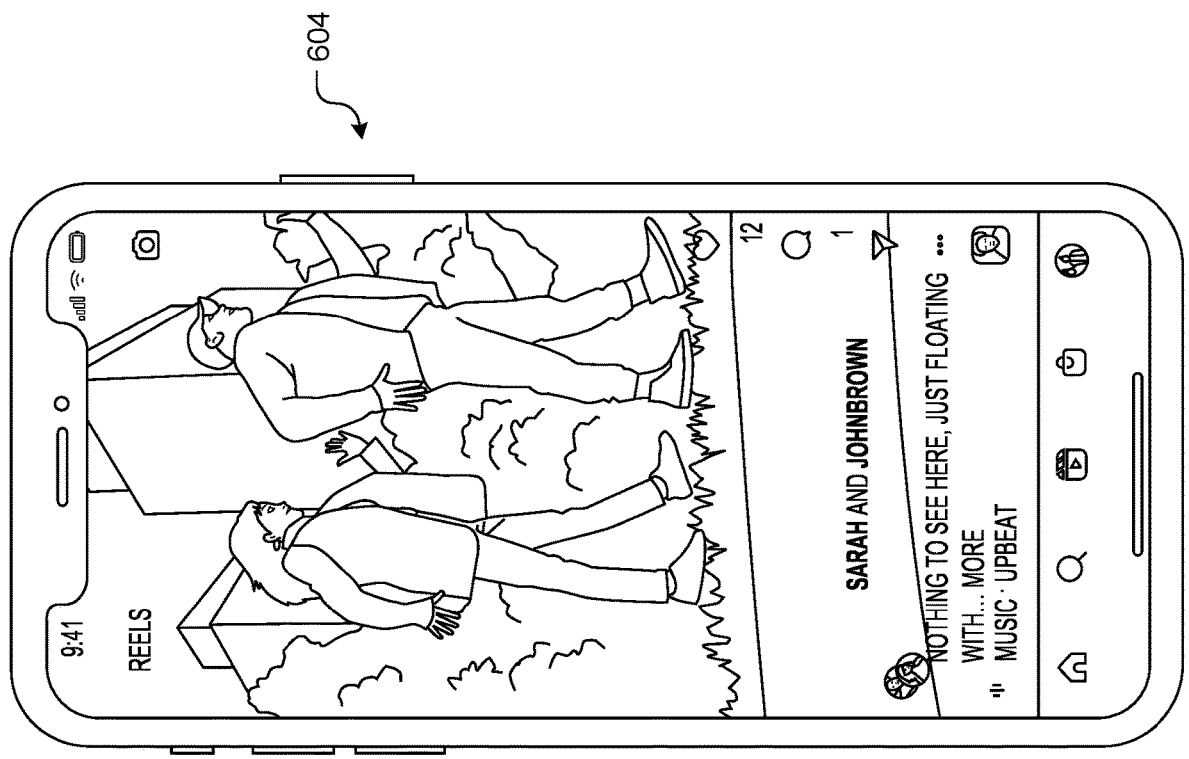
FIG. 6 is a view of example interfaces associated with a user consuming collaborative content according to some implementations.
Figure 6:
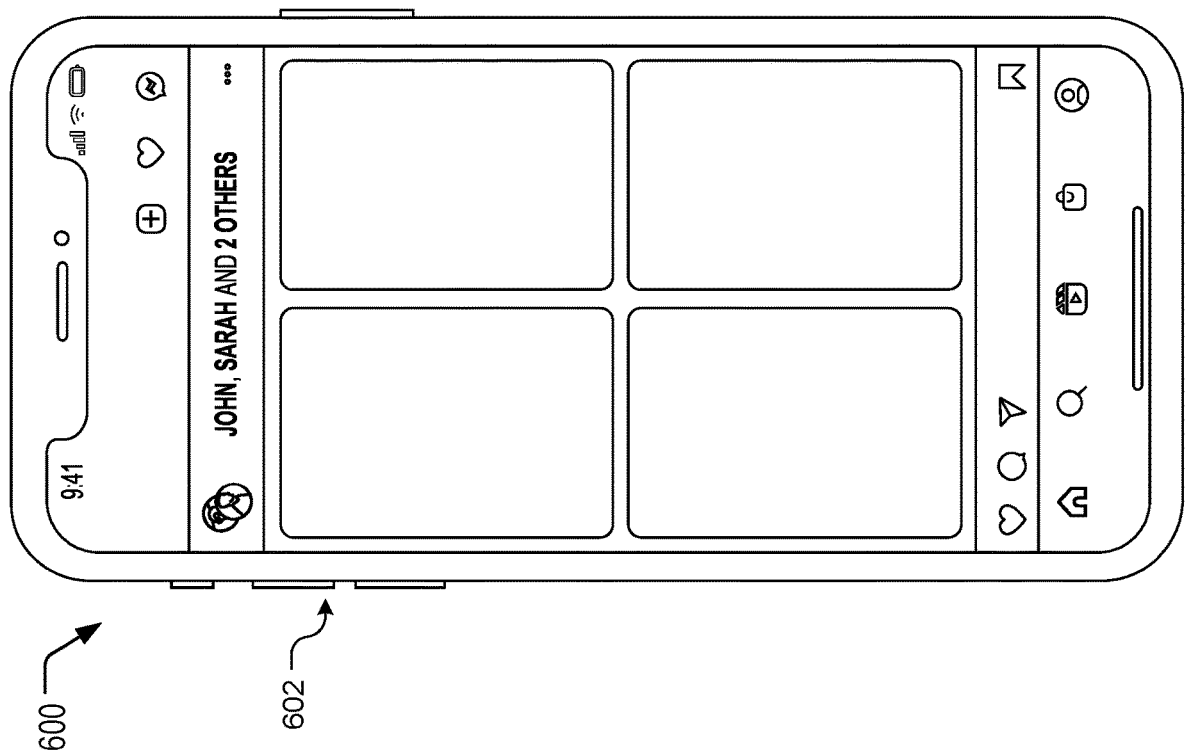

FIG. 6 is a view of example interfaces 600 associated with a user consuming collaborative content according to some implementations. With respect to interface 602, the consuming user may view, concurrently, the content and the collaborators. In this example, the collaborators are depicted using multiple icons (e.g., one for each collaborator) as well as via the user account names as shown.

Similar, the interface 604 illustrates a user consuming a live feed or discussion between multiple collaborators. In this example, content associated with four different collaborators have been merged into a single content. The collaborative content is again displayed together or concurrently with the collaborator's icons and the collaborator's user account names In this example, the social networking system may include a predetermined number (e.g., 2) of collaborators identifying information that may be displayed concurrently with the collaborative content. As such, the icons and user account name of the predetermined number of collaborators is shown together with the phrase "and 2 others". In this example, the additional (e.g. 2 collaborators) may be presented to the consuming user by selecting, in some examples, of the area associated with the collaborator's information or, in the illustrated example, an icon associated therewith.

Figure 7:
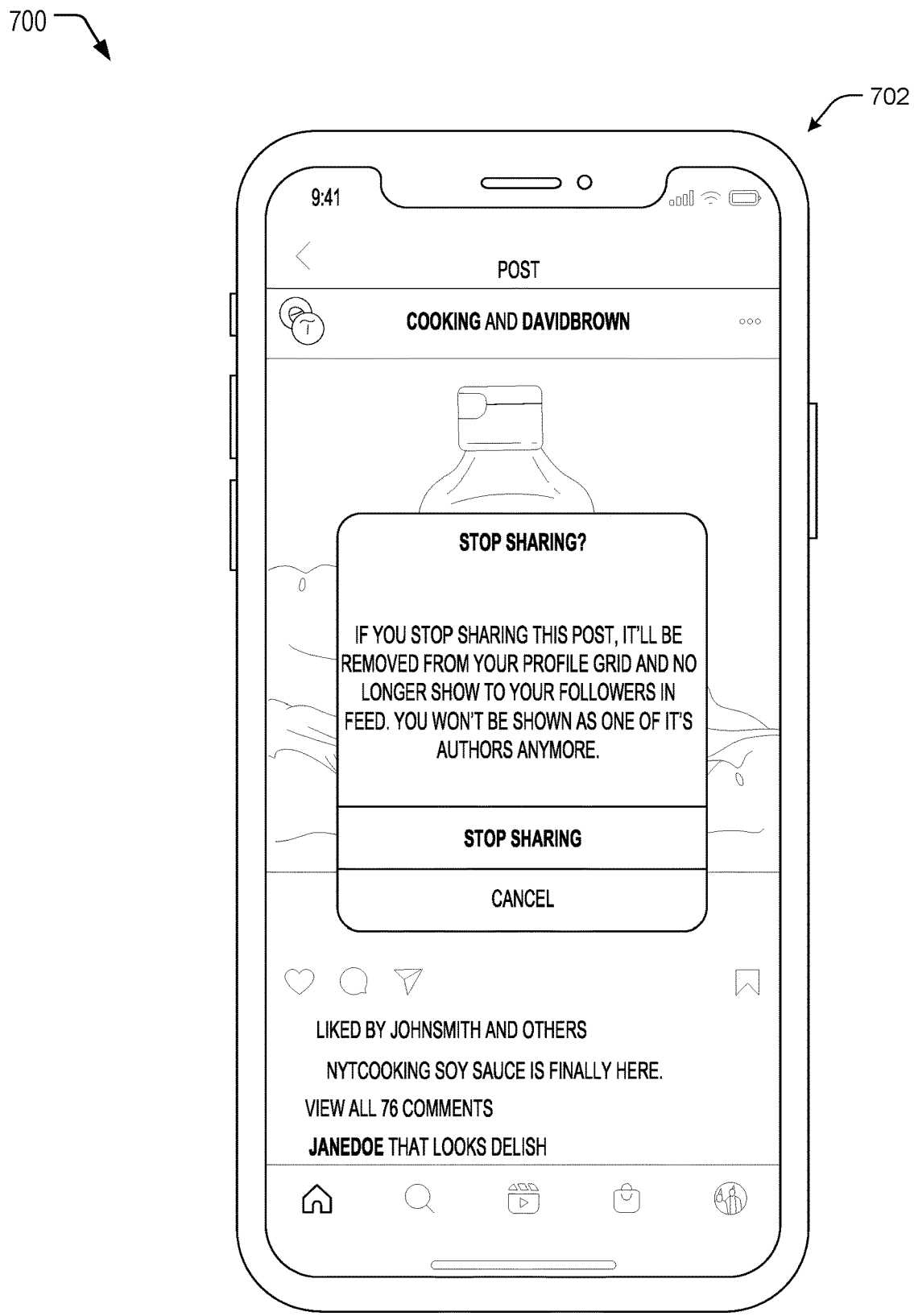
FIG. 7 is a view of example interfaces associated with a user disassociating with a collaborative content item according to some implementations.

FIG. 7 is a view of example interfaces 700 associated with a user disassociating with a collaborative content item according to some implementations. In some cases, the collaborators on collaborative content may be restricted from deleting or otherwise removing the content from the social networking system, unlike their own individual content. Thus, any individual collaborator may desire to withdraw from collaboration with respect to particular content. In some case, a collaborator may do so via the interface 702 by selecting the collaborative post or content and selecting a stop sharing option. When the collaborator selects the stop sharing option, the collaborators account is removed from the attribution section (e.g., the user account name and icon are no longer displayed in conjunction with the collaborative content) and the collaborative content may be removed from their account (e.g., removed from their feed, home page, and the like).

Figure 8:
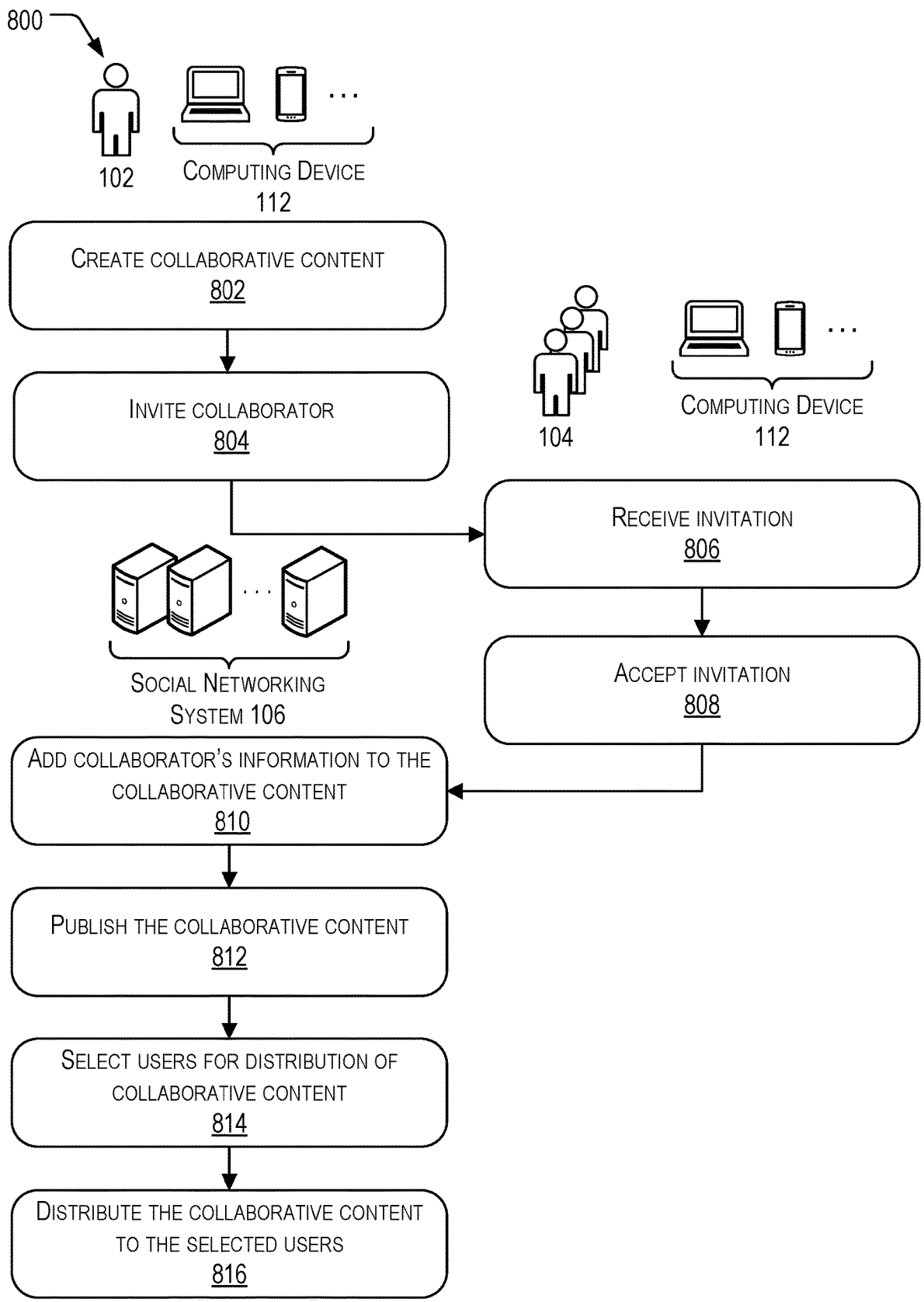
FIG. 8 is a flow diagram illustrating an example process for inviting collaborators to contribute to collaborative content according to some implementations.
Figure 9:
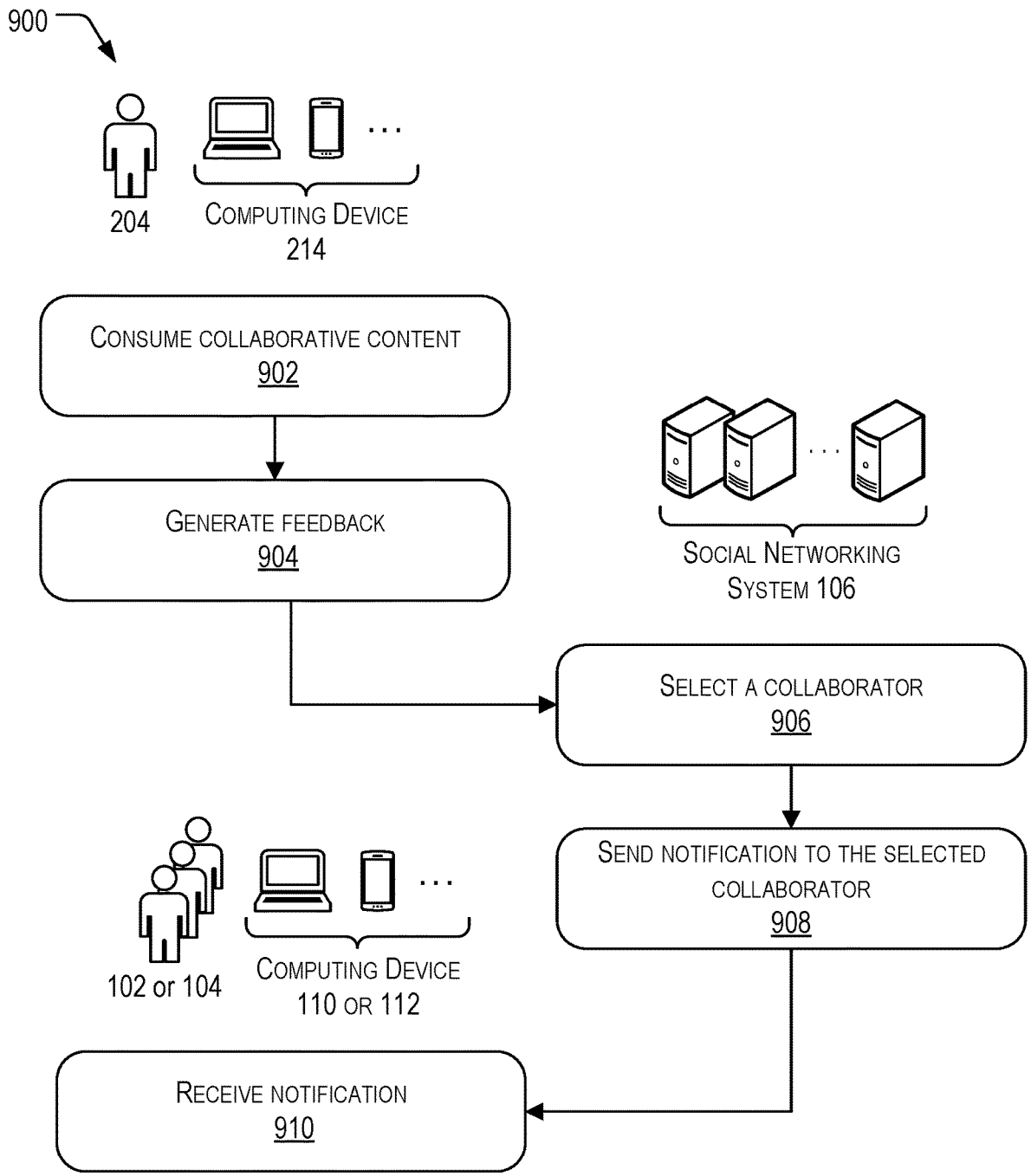
FIG. 9 is a flow diagram illustrating an example process for disturbing feedback associated with collaborative contented according to some implementations.

FIGS. 8 and 9 are flow diagrams illustrating example processes associated with the collaborative accounts as discussed above. The processes are illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the processes, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 8 is a flow diagram illustrating an example process 800 for inviting collaborators to contribute to collaborative content according to some implementations. As discussed above, a primary author, such as the user 102 of FIG. 1, may create collaborative content and invite other users, such as the user 104 of FIG. 1, to participate as collaborator.

At 802, a user 102, such as the primary author, may create collaborative content. For example, the user 102 may upload or otherwise add the collaborative content to the social networking system.

At 804, the user 102 may invite or otherwise select other users, such as user 104, to become a collaborator with respect to the collaborative content and, at 806, the user 104 may receive the invitation. For example, the user 102 may select the user 104 by typing or entering the user's name, selecting the user 104 from a list or other tagged content, and the like. In this implementation, it should be understood that the invitation may be incorporated into the collaborative content creation process or performed as a separate process at a later time.

At 808, the user 104 may accept the invitation. For example, the invitation may be in the form of a notification or alert as including a selectable option to accept. If the user 104 accepts, the process 800 proceeds to 810, otherwise the invitation may either remain open, be closed by the user 102, closed by the user 104, expire after a period of time elapses, or the like. It should be understood that if the user 104 does not accept the invitation, the user 104 will not be added or otherwise associated with the collaborative content.

At 810, the social networking system 106 may add the collaborator's information (e.g., the information of the user 104) to the collaborative content in response to receiving the corresponding acceptance. Once added, the collaborator may be listed as a collaborator to additional users viewing the collaborative content, as discussed above.

At 812, the social networking system 106 may publish the collaborative content. For example, in some instances, as each individual collaborator is associated with or otherwise added to the collaborative content, the social networking system may publish the collaborative content to a location associated with the individual collaborator's account. In this example, the content is published at 812, however, it should be understood that in other examples the content may be published at other times associated with the process 800. For example, the collaborative content may be published between 802 and 804 and the like.

At 814, the social networking system 106 may select users for distribution of the collaborative content and, at 816, the social networking system may distribute the collaborative content to the selected users. For example, the social networking system may select users for distribution or notification related to the collaborative content after each collaborator accepts the invitation. The distribution following the accepted invitation may be notifying users of the social networking system that have indicated an interest content of the user 104. In some cases, the notification associated with the distribution may include a link or otherwise direct the viewing or consuming user to the publication instance of the collaborative content associated with the account of the user 104. In this example, the users receiving the distribution or notification with respect to the user 104 may consume the collaborative content in association with the account of the user 104.

In some examples, prior to sending the notifications or otherwise distributing the collaborative content to additional users of the social networking system associated with the user 104, the social networking system may filter the users to prevent a particular user from receiving multiple distributions of and/or notifications associated with the collaborative content. For example, if a first user has indicated an interest in content of the user 102 and content of the user 104, the social networking system 106 may have already provided or notified the first user as to the collaborative content. Thus, when the user 104 is added as a collaborator with respect to the collaborative content, the social networking system 106 may filter the first user from the selected users, such that the first user does not receive a duplicate distribution of the collaborative content.

FIG. 9 is a flow diagram illustrating an example process 900 for disturbing feedback associated with collaborative contented according to some implementations. In some cases, users of the social networking system 106 consuming collaborative content may provide feedback associated with the collaborative content, such as comments, likes, dislikes, etc.

At 902, a user 204 may consume the collaborative content. For example, the user 204 may consume the content by viewing or streaming the collaborative content from the social networking system 106 via the computing devices 214. In some cases, as the user 204 streams or views the collaborative content, the social networking system may cause information associated with the collaborators to be displayed adjacent to or in conjunction with the collaborative content on the display of the computing device 214.

At 904, the user 204 may generate feedback associated with the collaborative content. As discussed above, the feedback may include comments, likes, dislikes, shares, as well as other feedback related to the collaborative content posted to the collaborative account.

At 906, the social networking system 106 may select collaborators associated with the collaborative account to receive the feedback and/or a notification associated with the feedback as all of the collaborators may not necessarily need to respond. For example, the social networking system 106 may select the collaborators based at least in part on content of the feedback, the type of feedback, the users that contributed to the collaborative content, and the like.

At 908, the social networking system 106 may send a notification to the selected collaborator (e.g., user 102 or 104) and, at 910, the selected collaborator may receive the notification. The collaborator may then respond in various manners to the feedback. In some cases, the social networking system 106 may also restrict the other collaborators from responding to the feedback, such as to prevent multiple and/or duplicative responses to the feedback. In some examples, the restriction on responding may be lifted after a period of time has been meet or otherwise expires.

Figure 10:
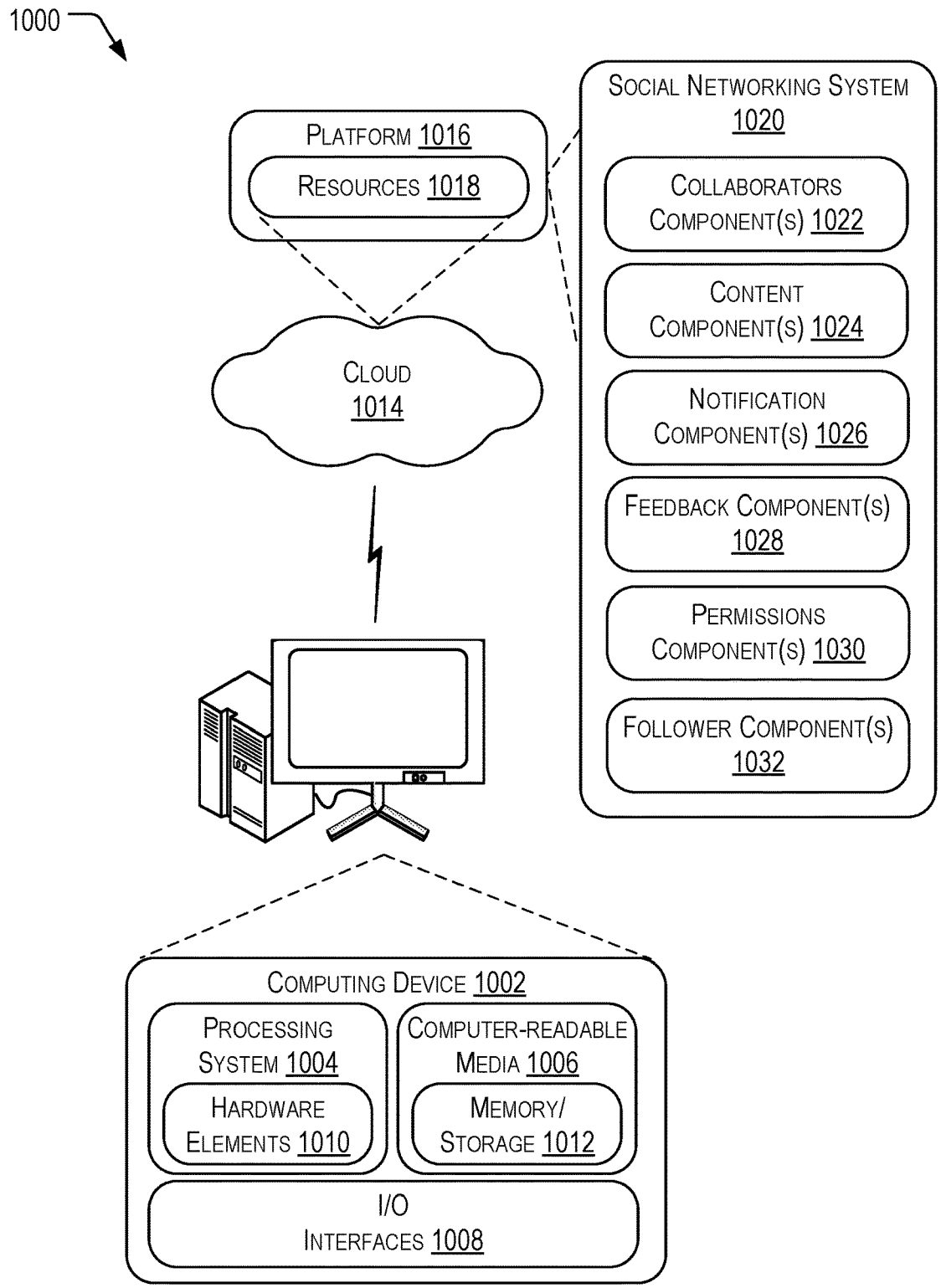
FIG. 10 is an example system and device that is usable to implement the techniques described herein according to some implementations.

FIG. 10 illustrates an example system generally at 1000 that includes an example computing device 1002 that is representative of one or more computing systems and/or devices that may implement the various techniques described herein. This is illustrated through inclusion of a social networking system 1020 comprising a collaborators component 1022, a content component 1024, a notification component 1026, a feedback component 1028, a permission component 1030, and a follower component 1032.

The collaborators component 1022 may be configured to assist a primary author (or other collaborator) with respect to adding or inviting additional users to become collaborators with respect to the collaborative content. In some cases, the collaborators component 1022 may also assist one or more of the collaborators with withdrawing as a collaborator on particular collaborative content.

The content component 1024 may be configured to assist with publishing instances of the collaborative content, generating collaborative content, and/or attributing credit for the collaborative content between the collaborators.

The notification component 1026 may be configured to provide notifications related to newly added content, newly added collaborators, and/or feedback to, respectively, the users of the social networking system 1020. In some cases, the notification component 1026 may assist with filtering users receiving the notification as users accept invitations to collaborate on content to reduce duplicative distributions of the collaborative content.

The feedback component 1028 may be configured to assist with identifying one or more users to receive the feedback related to the collaborative content. For example, the feedback component 1028 may select one or more of the collaborators to receive and respond to the feedback on any particular content item to, for instance, avoid duplicative responses and follow up with respect to the feedback.

The permission component 1030 may be configured to allow a founder user, such as a user 102 of FIG. 1, or other designated collaborator to grant or otherwise control permissions with respect to the collaborative content. In some cases, the permissions may include editing the collaborative content, deleting the collaborative content, pinning comments to the collaborative content, disabling and/or enabling commenting with regards to the collaborative content, applying or selecting filters for comments of the collaborative content, viewing insights or metrics associated with the collaborative content, promoting the collaborative content, inviting collaborators, archiving the collaborative content, and the like.

The follower component 1032 may be configured to assist with selecting followers of collaborators to invite to follow the collaborative account. The follower component 1032 may also be configured to select individual users to receive notifications of collaborative content posted with respect to the collaborative account.

The computing device 1002 may be, for example, a server of a service provider, a device associated with a client (e.g., a client device), an on-chip system, and/or any other suitable computing device or computing system. The example computing device 1002 as illustrated includes a processing system 1004, one or more computer-readable media 1006, and one or more I/O interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that may be configured as processors, functional blocks, and so forth. This may include implementation in hardware as an application specific integrated circuit or other logic device formed using one or more semiconductors. The hardware elements 1010 are not limited by the materials from which they are formed, or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage 1012 may include volatile media (such as random access memory (RAM)) and/or nonvolatile media (such as read only memory (ROM), Flash memory, optical disks, magnetic disks, and so forth). The memory/storage 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "logic," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on and/or transmitted across some form of computer-readable media. The computer-readable media may include a variety of media that may be accessed by the computing device 1002. By way of example, and not limitation, computer-readable media may include "computer-readable storage media" and "computer-readable transmission media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer-readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable transmission media" may refer to a medium that is configured to transmit instructions to the hardware of the computing device 1002, such as via a network. Computer-readable transmission media typically may transmit computer-readable instructions, data structures, program modules, or other data in a modulated data signal, such as carrier waves, data signals, or other transport mechanism. Computer-readable transmission media also includes any information delivery media. The term "modulated data signal" means a signal that has one or more of its characteristics set or changed in such a manner as to encode information in the signal. By way of example, and not limitation, computer-readable transmission media include wired media such as a wired network or direct-wired connection, and wireless media such as acoustic, radio frequency (RF), infrared, and other wireless media.

As previously described, hardware elements 1010 and computer-readable media 1006 are representative of modules, programmable device logic and/or device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers)

and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also be scalable to provide a corresponding level of scale to encountered demand for the resources 1018 that are implemented via the platform 1016. Accordingly, in an interconnected device embodiment, implementation of functionality described herein may be distributed throughout multiple devices of the system 1000. For example, the functionality may be implemented in part on the computing device 1002 as well as via the platform 1016 which may represent a cloud computing environment or cloud 1014.

CONCLUSION

Although the discussion above sets forth example implementations of the described techniques, other architectures may be used to implement the described functionality and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   receiving, from a first user account of a social networking system, content to associate with the first user account;
   receiving, from the first user account, an indication of a second user account;
   sending, to the second user account, a collaboration invitation to cause the second user account to be indicated as an author of the content;
   receiving, from the second user account, an acceptance of the collaboration invitation;
   publishing the content to a first post of the social networking system associated with the first user account and a second post of the social networking system associated with the second user account, the content including a first indicator attributing the content to the first user account and a second indicator attributing the content to the second user account;
   identifying a third user account, the third user account having previously indicated, via the social networking system, an interest in the second user account; and
   sending, to the third user account, a notification associated with the content.

2. The method as recited in claim 1, further comprising determining, prior to sending the notification, that the third user account has not previously indicated, via the social networking system, an interest in the first user account.

3. The method as recited in claim 1, further comprising granting a permission to the second user account with respect to the content.

4. The method as recited in claim 3, wherein the permission comprises at least one of:
   an edit content permission for the content;
   a delete content permission for the content; or
   a feedback permission for the second user account.

5. The method as recited in claim 1, further comprising:
   receiving, from the third user account, feedback associated with the content;
   selecting the second user account based at least in part on the third user account having indicated the interest in the second user account; and
   sending, to the second user account, a notification associated with the feedback.

6. One or more non-transitory computer-readable media storing instructions that, when executed by one or more processors, cause one or more computing devices to perform operations comprising:
   receiving content to associate with a first account of a social networking system;
   publishing the content to a first post of the social networking system associated with the first account, the content including a first indicator attributing the content to the first account;
   receiving, from the first account, an indication of a second account;
   sending, to a second account, a collaboration invitation to cause the second account to be indicated as an author of the content;
   receiving, from the second account, an acceptance of the collaboration invitation; and
   updating, in response to receiving the acceptance, the content to include a second indicator attributing the content to the second account.

7. The one or more non-transitory computer-readable media as recited in claim 6, wherein the operations further comprise publishing, in response to receiving the acceptance, the content to a second post of the social networking system associated with the second account.

8. The one or more non-transitory computer-readable media as recited in claim 7, wherein the operations further comprise:
   identifying a third account, the third account having previously indicated, via the social networking system, an interest in the second account; and
   sending, to the third account, a notification associated with the content.

9. The one or more non-transitory computer-readable media as recited in claim 8, wherein the notification indicates the second post of the social networking system.

10. The one or more non-transitory computer-readable media as recited in claim 8, wherein the operations further comprise:
    receiving, from the third account, feedback associated with the content;
    selecting the second account based at least in part on a relationship between the third account and the second account; and
    sending, to the second account, a notification associated with the feedback.

11. The one or more non-transitory computer-readable media as recited in claim 10, wherein the operations further comprise:
    restricting, in response to selecting the second account, the first account from replying to the feedback for a predetermined period of time.

12. The one or more non-transitory computer-readable media as recited in claim 10, wherein selecting the second account is based at least in part on a relationship between the third account and the first account.

13. The one or more non-transitory computer-readable media as recited in claim 10, wherein selecting the second account is based at least in part on the content and the feedback.

14. A social networking system comprising:
one or more processors; and
one or more computer-readable media storing instructions that, when executed by the one or more processors, cause the one or more processors to perform operations comprising:
receiving content to associated with a first account of a social networking system;
publishing the content to a first post of the social networking system associated with the first account, the content including a first indicator attributing the content to the first account;
receiving, from the first account, an indication of a second account;
sending, to a second account, a collaboration invitation to cause the second account to be indicated as an author of the content;
receiving, from the second account, an acceptance of the collaboration invitation; and
updating, in response to receiving the acceptance, the content to include a first indicator attributing the content to the first account and a second indicator attributing the content to the second account.

15. The social networking system as recited in claim 14, wherein the operations further comprise publishing, in response to receiving the acceptance, the content to a second post of the social networking system associated with the second user account.

16. The social networking system as recited in claim 15, wherein the operations further comprise:
identifying a third account, the third account having previously indicated, via the social networking system, an interest in the second account; and
sending, to the third account, a notification associated with the content.

17. The social networking system as recited in claim 16, wherein the notification indicates the first post of the social networking system.

18. The social networking system as recited in claim 16, wherein the operations further comprise:
receiving, from the third account, feedback associated with the content;
selecting the second account based at least in part on the third account indicating the interest in the second account; and
sending, to the second account, a notification associated with the feedback.

19. The social networking system as recited in claim 15, wherein the operations further comprise:
receiving, from the first account, a request to delete the content; and
removing, in response to receiving the request to delete the content, the content from the first post of the social networking system and the second post of the social networking system.

20. The social networking system as recited in claim 15, wherein the operations further comprise:
receiving, from the second account, a request to delete the content;
determining that the second user account is not authorized to delete the content; and
removing, in response to receiving the request to delete the content, the second indicator attributing the content to the second account from the content and deleting the content at the second post of the social networking system.

\* \* \* \* \*